United States Patent
Raymond

(10) Patent No.: US 9,630,482 B2
(45) Date of Patent: Apr. 25, 2017

(54) SYSTEM FOR DRIVING THE DRIVE WHEELS OF AN ELECTRIC OR HYBRID VEHICLE

(71) Applicant: PANTERO TECHNOLOGIES INC., Montreal (CA)

(72) Inventor: Jean Raymond, Montreal (CA)

(73) Assignee: PANTERO TECHNOLOGIES INC., Montreal, QC (CA)

( * ) Notice: Subject to any disclaimer, the term of this patent is extended or adjusted under 35 U.S.C. 154(b) by 255 days.

(21) Appl. No.: 14/401,306

(22) PCT Filed: May 24, 2013

(86) PCT No.: PCT/CA2013/000512
§ 371 (c)(1),
(2) Date: Nov. 14, 2014

(87) PCT Pub. No.: WO2013/173915
PCT Pub. Date: Nov. 28, 2013

(65) Prior Publication Data
US 2015/0096823 A1   Apr. 9, 2015

(30) Foreign Application Priority Data
May 25, 2012   (CA) ..................... 2778845

(51) Int. Cl.
*B60K 1/02* (2006.01)
*B60K 17/14* (2006.01)
(Continued)

(52) U.S. Cl.
CPC ............. *B60K 1/02* (2013.01); *B60K 17/14* (2013.01); *B60K 17/30* (2013.01);
(Continued)

(58) Field of Classification Search
CPC ............. B60K 1/02; B60K 2001/0405; B60K 2001/0416; B60K 2001/0438; B60K 17/14; B60K 17/30
See application file for complete search history.

(56) References Cited

U.S. PATENT DOCUMENTS 1,951,089 A * 3/1934 Fielder ..................... B60K 5/08
                                                      180/65.25
2,047,050 A * 7/1936 Armington ............. B60K 1/02
                                                      180/6.44

(Continued)

OTHER PUBLICATIONS

International Search Report, PCT/CA2013/000512, Aug. 27, 2013.

*Primary Examiner* — Joseph Rocca
*Assistant Examiner* — Maurice Williams
(74) *Attorney, Agent, or Firm* — Norton Rose Fulbright Canada LLP

(57) ABSTRACT

The invention relates to a system for driving the drive wheels (1) of a vehicle, comprising two sets of electric motors (2) and casings (3) (left and right). Each of the casings (3) comprises an input pinion (8) which rotates interdependently with the rotor of one of the electric motors (2) as well as with a set of gears (12) driving the ring gear (7) of a planetary gear set (4). The two planetary gear sets (4) are connected to one another by a connecting means (9) that rotates interdependently with each of the two sun gears (5) (inner planetaries). The planet carrier (6) of each of the planetary gear sets (4) rotates interdependently with a connecting means (11) of one of the drive wheels (1). The two planetary gear sets (4) perform a double differential function. The invention also relates to a method for controlling the electric motors (2) that allows the drive system to be used as a torque converter. The drive system can be fixed to the chassis frame of the vehicle. In addition, the two casings (3) can be located in the wheel cages (13). The connecting (Continued)

means (9) that rotates interdependently with the two sun gears (5) can be located inside the casing of the floor pan (14) of the vehicle. The two electric motors (2) can be located just behind the driven wheels (1).

19 Claims, 8 Drawing Sheets

(51) Int. Cl.
  *B60K 17/30* (2006.01)
  *B60K 1/04* (2006.01)
(52) U.S. Cl.
  CPC ........... *B60K 2001/0405* (2013.01); *B60K 2001/0438* (2013.01); *B60Y 2200/1432* (2013.01)

(56) References Cited

U.S. PATENT DOCUMENTS

| | | | |
|---|---|---|---|
| 3,799,284 A * | 3/1974 | Hender | B60K 1/02 180/65.25 |
| 3,862,667 A | 1/1975 | Wolansky | |
| 4,803,897 A * | 2/1989 | Reed | B62D 11/10 475/6 |
| 5,188,195 A | 2/1993 | Haustein | |
| 5,924,506 A * | 7/1999 | Perego | B60K 7/0007 180/252 |
| 5,947,855 A * | 9/1999 | Weiss | B60K 6/36 180/65.25 |
| 6,035,956 A | 3/2000 | Maurer et al. | |
| 6,139,464 A | 10/2000 | Roske | |
| 6,387,007 B1 * | 5/2002 | Fini, Jr. | B60K 6/26 180/65.22 |
| 6,820,707 B1 * | 11/2004 | Cantemir | B60T 1/062 180/65.6 |
| 6,978,853 B2 * | 12/2005 | Bennett | B60K 6/46 180/297 |
| 7,363,995 B2 * | 4/2008 | Downs | B60K 7/0007 180/292 |
| 7,520,354 B2 * | 4/2009 | Morrow | B60K 6/365 180/271 |
| 8,640,801 B2 * | 2/2014 | Hennings | B60K 7/0007 180/65.6 |
| 2003/0111280 A1 * | 6/2003 | Platner | B60K 1/02 180/65.6 |
| 2011/0237387 A1 * | 9/2011 | Yang | B60W 10/08 477/5 |
| 2014/0371016 A1 * | 12/2014 | Knoblauch | B60K 1/02 475/5 |

\* cited by examiner

SYSTEM FOR DRIVING THE DRIVE WHEELS OF AN ELECTRIC OR HYBRID VEHICLE

TECHNICAL FIELD

The present invention relates to a system for driving the drive and optionally steer wheels of an electric or hybrid vehicle.

PRIOR ART

Historically, the rear axle of the urban buses has been inspired by the rear axle of heavy trucks in which one finds an imposing differential at the center of a driving axle that puts the wheels in rotation. The result of this type of arrangement is a large space requirement at the center of the vehicle, which generates a higher height of the floor and a significant unsprung mass.

Commonly today, the low-floor urban buses use an axle concept with inverted portal as described by the U.S. Pat. No. 6,035,956, among others, in which the axle shaft and the axle structure, forming a live axle assembly, are offset vertically (downward) from the center of the wheels, and in which speed reduction gears are distributed on each side of the vehicle near the wheels. The notion of a lowered driving axle had already been introduced by the U.S. Pat. No. 3,862,667, among others, for a front axle of commercial vehicles.

This inverted-portal axle approach is also the basis of several other patents (for example, U.S. Pat. No. 6,139,464) that adapt this concept in order to introduce an electric drive means on a low-floor vehicle. In this type of approach, the shaft inside the axle is eliminated and replaced by electric motors located in the immediate vicinity of each of the wheels on each side of the axle and attached to the latter. The electric motors are independent, and the differential is typically managed electronically. This type of arrangement constitutes a simple development of the inverted-portal axle concept and, among others, has the disadvantage of increasing the unsprung mass. Furthermore, although an electronic differential can be produced today, it remains complex, expensive and subject to the failure of electronic components.

As for the U.S. Pat. No. 5,188,195 of Haustein, it introduces another arrangement. First, the differential becomes independent of the axle and is mounted directly on the chassis. Two half-shafts then transmit the power to the wheels. The Haustein system introduces the concept of longitudinally separating the structural axis which maintains the wheels in position interdependently on each side of the power train. Thus, the axis of the non-driving axle is offset with respect to the axis of the half-shafts and of the wheels. This type of arrangement makes it possible to lower the floor slightly, but not sufficiently in comparison with the inverted portal approach, and above all to reduce the unsprung mass.

With regard to the electric drive, the U.S. Pat. No. 3,799,284 of Hender describes an epicyclic gear-type double differential. This arrangement introduces the use of two independently rotating electric motors in which the torques of the motors will be opposite of one another at similar or different speeds and directions in order to put the wheels of the vehicle in rotation. The Hender arrangement offers advantages in terms of the electric drive, but does not however make possible an arrangement for a low-floor vehicle, and it also induces in an increase of the unsprung mass.

SUMMARY

According to one aspect of the invention, a drive system is proposed in order to improve the architecture of low-floor road vehicles by taking advantage of an electric power train.

According to a general aspect of the invention, a low-floor vehicle includes: a chassis frame and at least one left drive wheel and one right drive wheel that are connected by a non-driving rigid axle, a system for driving the drive wheels which is mounted on said chassis frame, said drive system including a left electric drive device and a right electric drive device, each of the drive devices including an electric motor mounted at a first end of a casing mounted on said chassis frame of the vehicle and having a transverse longitudinal orientation relative to said axle, said casing including an input pinion arranged at said first end and driven by the corresponding electric motor, an epicyclic gear train driven by said input pinion via a gear set, said epicyclic gear train having a ring gear, a planet wheel carrier and a sun gear, either one of the ring gear and of the planet wheel carrier being rigidly connected to a half-shaft arranged at an output of a second end of the casing, said half-shaft being rotatably secured to a corresponding wheel of said left and right drive wheels, said half-shaft being provided at its ends with constant velocity joints, said epicyclic gear trains of the left and right casings being connected together by a linking means rotatably secured to their sun gear, said linking means being horizontally and vertically offset relative to said axle and located at the level of the lowered floor of the vehicle, the sun gears of the left and right casings having opposite torques, and in which the vehicle also includes a rotation reversal means in order to transmit to each of the drive wheels a rotation in a given same direction.

According to another aspect, a drive wheel and axle set of a vehicle includes: at least one left drive wheel and one right drive wheel, a non-driving rigid axle, a drive system including a left drive device and a right drive device mechanically connected together in order to make possible a combined driving effect for the left and right drive wheels; each of said drive devices including an electric motor and a casing, said casing including an input pinion rotatably secured to a rotor of said electric motor, said input pinion driving an epicyclic gear train via a gear means, said epicyclic gear train having a sun gear, a ring gear and a planet wheel carrier, said epicyclic gear train having a first output rotatably secured to a corresponding wheel of said drive wheels by the intermediary of a linking means including a half-shaft provided at its ends with constant velocity joints; the epicyclic gear trains of the casings of said left and right drive devices being connected together by a linking means rotatably secured to each of their sun gears, the linking means extending along an axis that is vertically and horizontally offset relative to an axis of the electric motors and to the axis of the drive wheels, the sun gears of the epicyclic gear trains having opposite torques, and in which the drive wheel and axle set also includes a rotation reversal means in order to transmit to each of the drive wheels a rotation in a given same direction.

According to another aspect, the drive system includes: a left drive device and a right drive device which are capable of being mounted interdependently on the chassis frame of a vehicle separately from an axle and set back from it, each of said drive devices including an electric motor and a casing, said casing including an input pinion rotatably secured to a rotor of said electric motor, said input pinion driving an epicyclic gear train via a gear means, said gear means having an input and an output horizontally and vertically spaced apart, said epicyclic gear train having a sun gear, a ring gear and a planet wheel carrier, said epicyclic gear train having a first output rotatably secured to a corresponding wheel of said drive wheels by the intermediary of a linking means including a half-shaft provided at its ends with constant velocity joints, the epicyclic gear trains of the left and right casings being connected together by a linking means rotatably secured to each of the sun gears of said epicyclic gear trains, the sun gears of the epicyclic gear trains having opposite torques, in which said gear means, said half-shafts and said constant velocity joints work together in order to make possible a horizontal and vertical offset of the linking means of the sun gears relative to the axis of the drive wheels and an axis of the electric motors, and in which the drive device also includes a rotation reversal means in order to transmit to each of the drive wheels a rotation in a given same direction.

BRIEF DESCRIPTION OF THE DRAWINGS

FIGS. 1 to 6 illustrate a drive system according to a possible embodiment of the present invention.

FIG. 1 is a perspective view of the drive system positioned with a wheel and axle set.

FIG. 4 illustrates the input and output points of a casing of said drive system.

FIG. 5 is a view of the gear set inside of one of the casings and showing the epicyclic gear train.

FIG. 6 is a perspective view of an embodiment of the system in the presence of the wheel wells, the floor envelope and the rigid axle of a vehicle.

PREFERRED EMBODIMENTS

Figure 1:
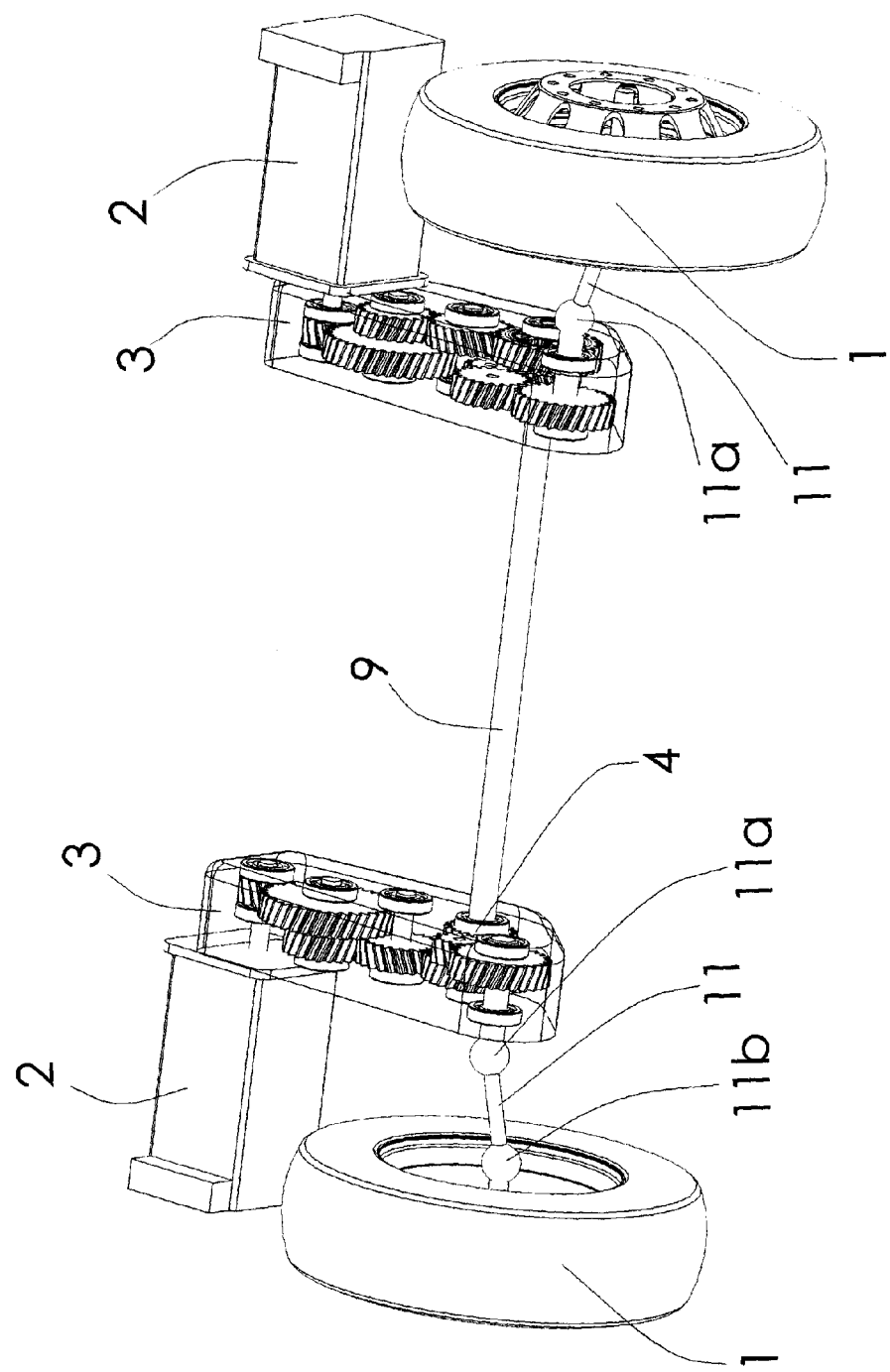

FIG. 1 illustrates a system for driving the drive and optionally steer wheels (1) of a vehicle. The system generally includes two drive devices mechanically connected for jointly driving at least one left drive wheel and one right drive wheel which are connected by a non-driving axle. As described in more detail below, the drive devices are attached to the sprung mass of the vehicle hereafter called chassis frame in a generic sense, which includes a chassis frame separate from the body as well as an integral chassis or any other component of a chassis such as a sub-frame. Each device includes an electric motor (2) and a casing (3). The motors (2) can be mounted on their respective casing (3) behind the wheels (1). As illustrated in FIGS. 2 to 5, each of the casings (3) includes an input pinion (8) rotatably secured to a rotor of a respective electric motor (2). Each casing (3)—left and right—includes an epicyclic gear train (4) in which a wheel toothed on the outside and on the inside acts as ring gear (7) (or outer planet wheel) and inside of which turn the planet gears and the sun gear (5) (or inner planet wheel). The ring gear (7) is mounted in the casing (3) in order to be driven in rotation by a gear set (12) which is itself driven by the input pinion (8) of the casing. The input and the output of the gear set (12) can be horizontally and vertically offset for reasons that will be discussed below. The planet wheel carrier (6) of the epicyclic gear train (4) in each casing (3)—left and right—is rotatably secured to one of the drive wheels (1) by the intermediary of a linking means. The linking means can include a toothed wheel or a gear set (10) driven by the planet wheel carrier (6), said linking means (10) being rotatably secured to a half-shaft (11) provided at its ends with constant velocity joints (11a, 11b). According to a possible embodiment of the invention, the constant velocity joints are of Thompson type. The half-shafts (left and right) (11) contribute toward horizontally and vertically offsetting the casings (3) from the axis of the wheels (1). Finally, the sun gears (5) of each of the epicyclic gear trains (4), left and right, are connected together by a linking means (9) rotatably secured to each of the sun gears (5). The linking means could, for example, be a shaft or else an assembly of two half-shafts as described hereafter. As illustrated in the drawings, the axis of the motors, the axis of the wheels and the axis of the linking means (9) are horizontally and vertically offset relative to one another. As will be seen below, this configuration contributes numerous advantages particularly in the context of a low-floor vehicle.

It is understood that the role of the ring gears (7) and of the planet wheel carriers (6) as described above can be reversed. Indeed, the planet wheel carrier (6) of each of the epicyclic gear trains (4), left and right, could be driven by the input pinion (8) of the corresponding casing (3), and the ring gear (7) of each of the epicyclic gear trains, left and right, could drive the linking means of the corresponding drive wheel (1).

Figure 4:
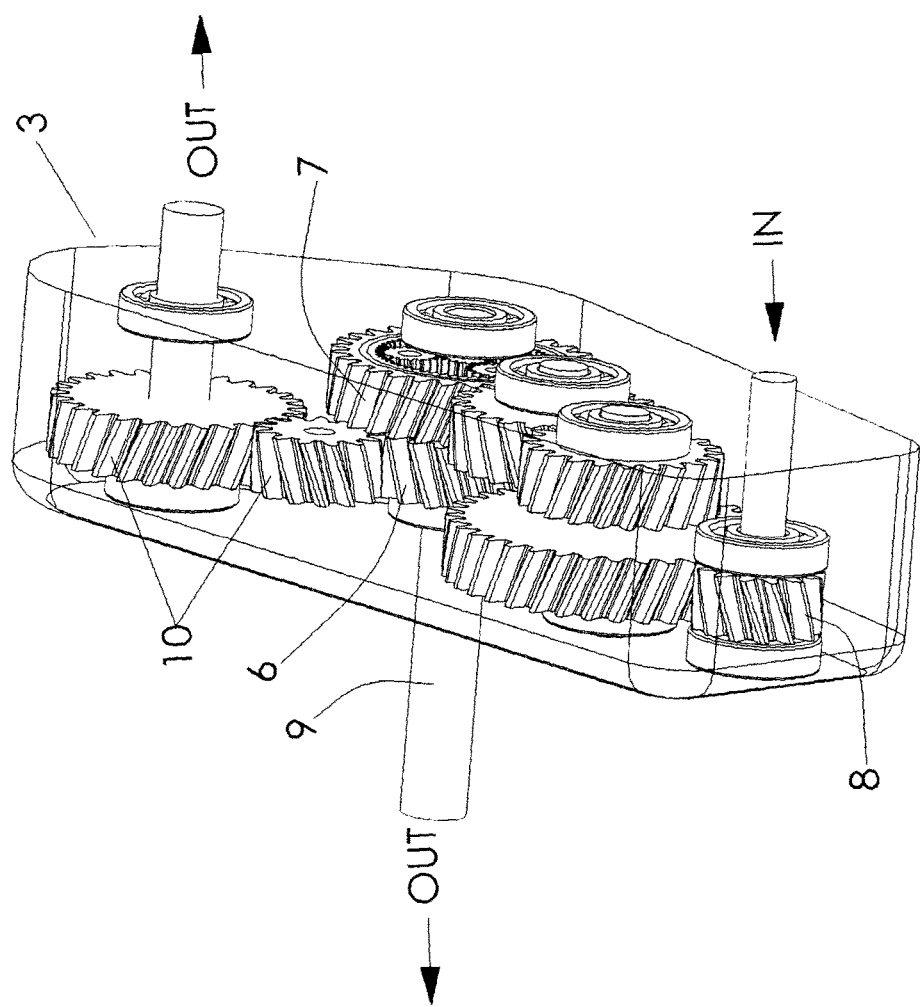
Figure 5:
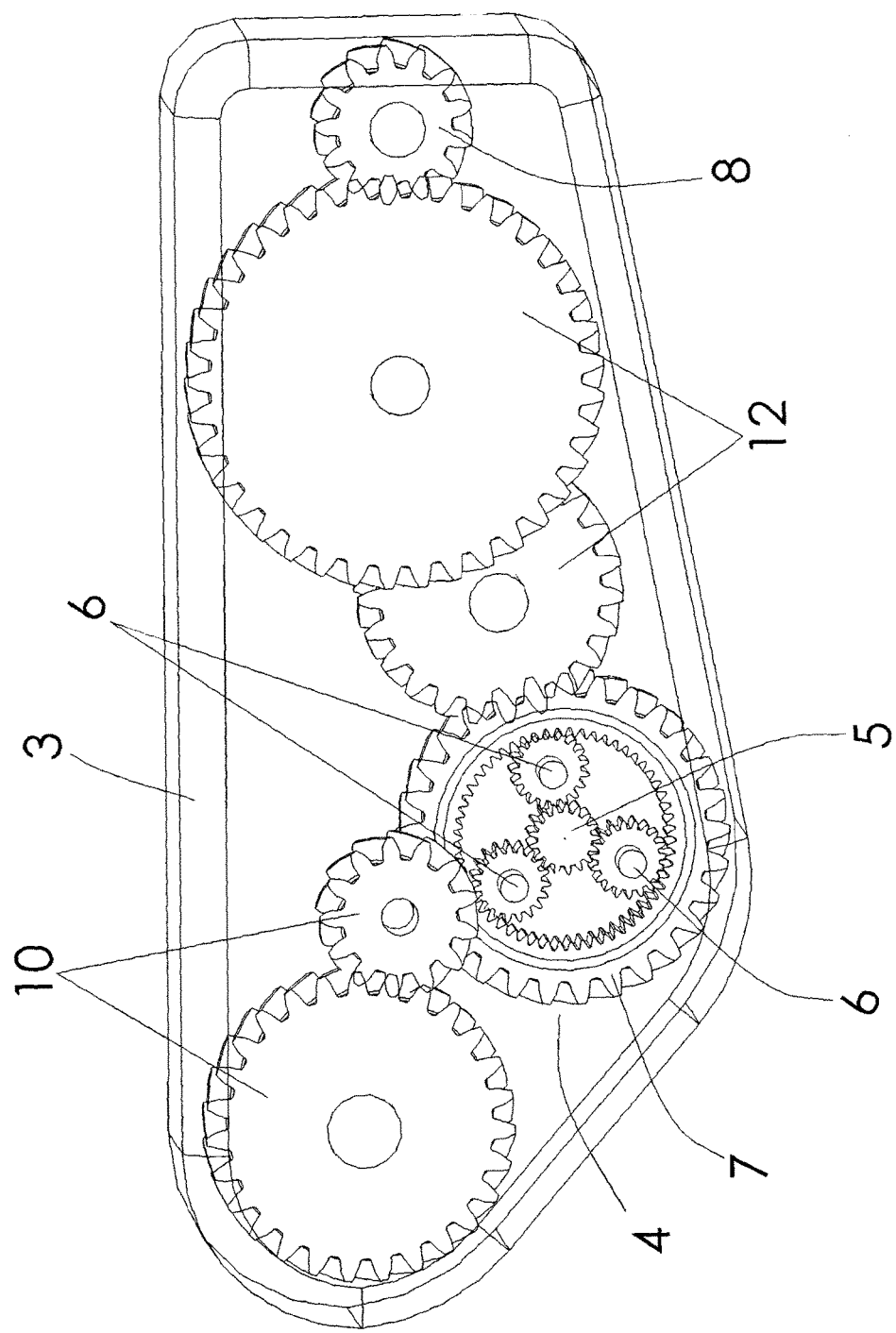

Therefore, for each side, left and right, the drive system has, as illustrated in FIG. 4, a casing (3) with system of gears including moreover an epicyclic gear train (4), and for each of these casings (3), there is an input for the output shaft of an electric motor (2), a first output towards one of the wheels (1) and a second output towards a linking means (for example, a shaft) connecting the two casings (3), right and left. The electric motors (2) are mounted at each of the inputs of each of the casings (3), left and right.

Figure 6:
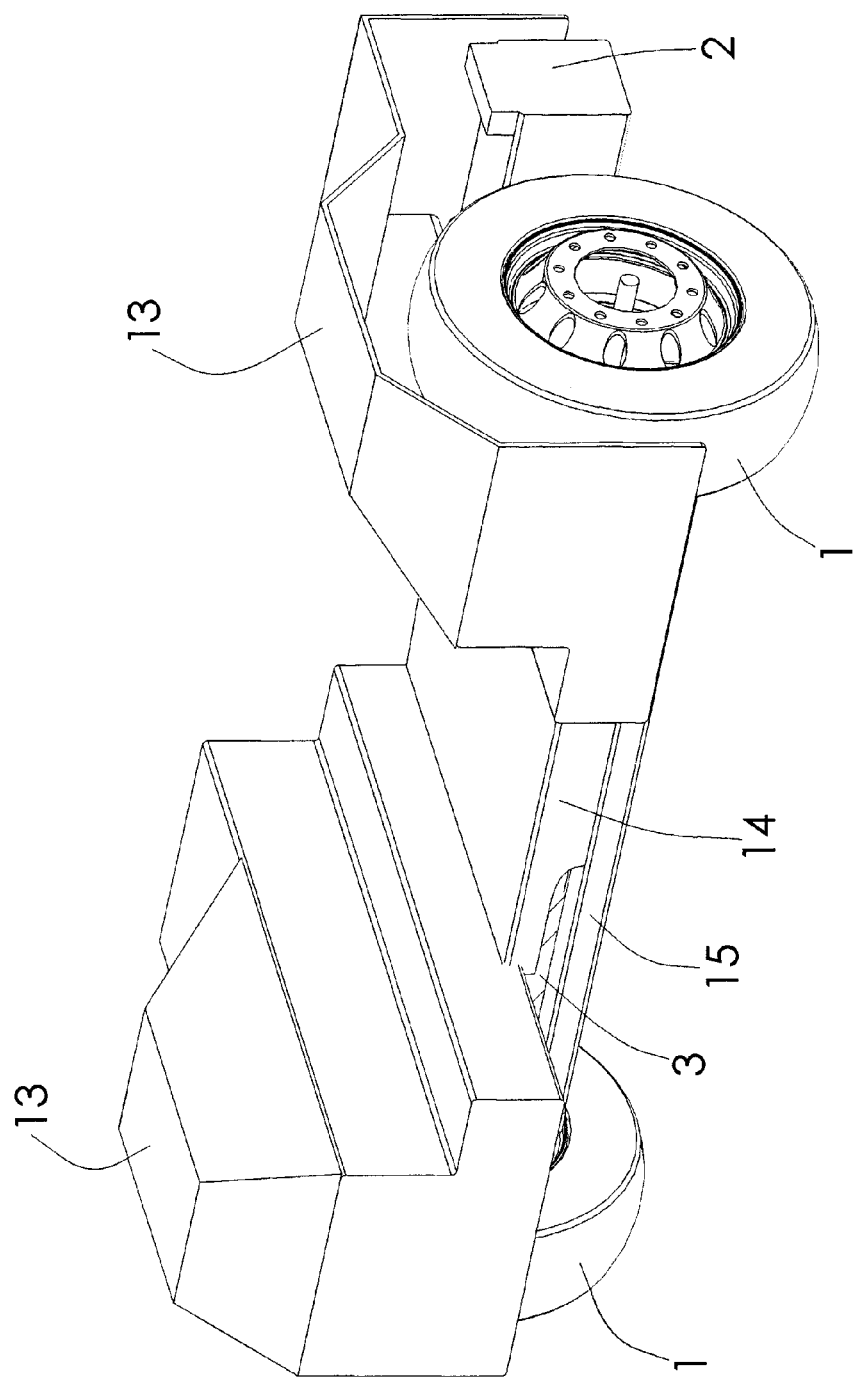

According to an embodiment, the drive system is characterized in that it is attached to the chassis frame of the vehicle. As illustrated in FIG. 6, the two casings (3) can be located in the wheel wells. Moreover, the linking means (9) rotatably secured to the two sun gears (5), left and right, can be located in the envelope of the floor (14) of the vehicle. The two electric motors (2) can be located just behind the drive wheels (1). The configuration of a system combining these features is particularly well suited to the arrangement of a wheel and axle set for low-floor commercial vehicles, such as an urban bus or a delivery truck. The system has the advantage of making it possible to free up the central space of a low-floor vehicle while minimizing the unsprung mass. The particular arrangement of the gears as illustrated, just as the location of the motors (2), is just one possible configuration considered.

Figure 3A:
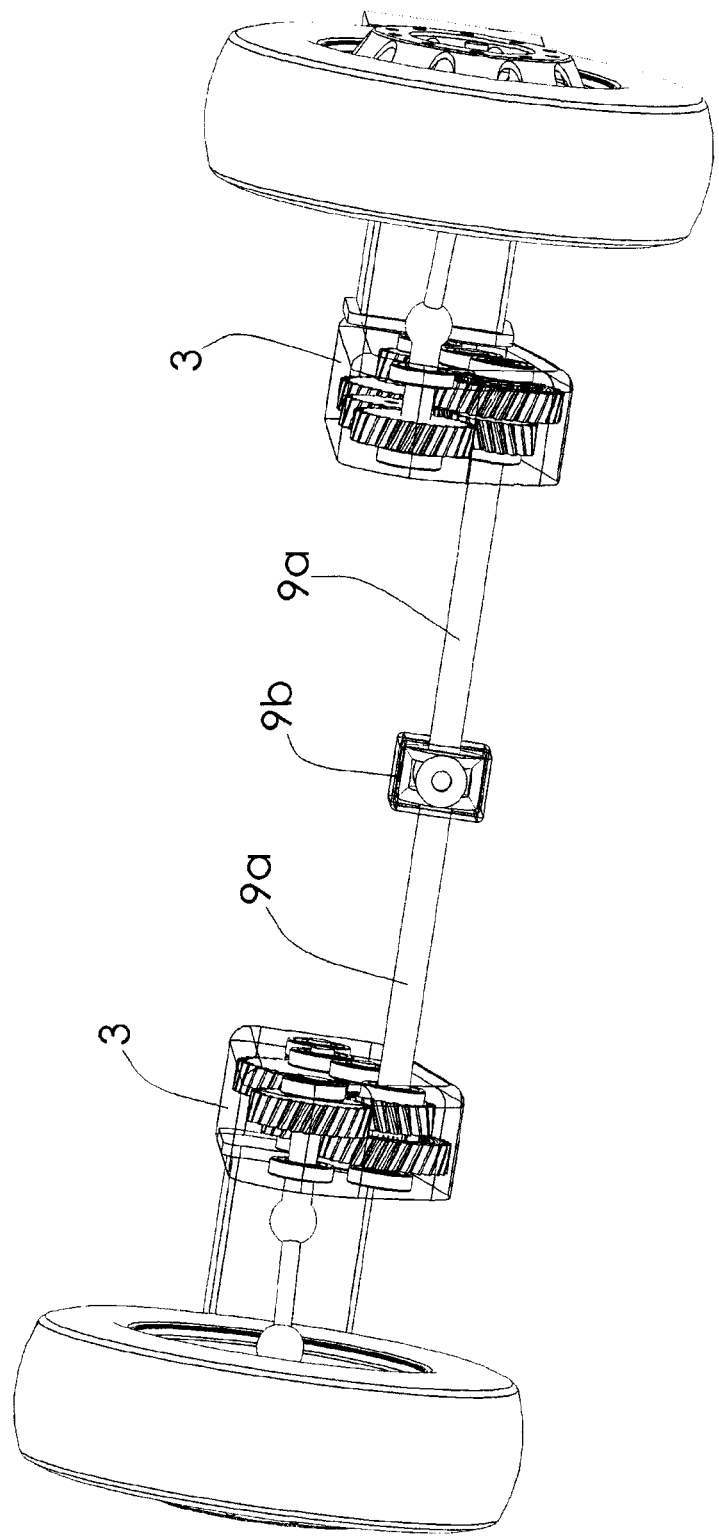
FIG. 3a is a perspective view of another embodiment of the system in which the linking means connecting the sun gears is made up of two half-shafts and of a reversal mechanism.
Figure 3B:
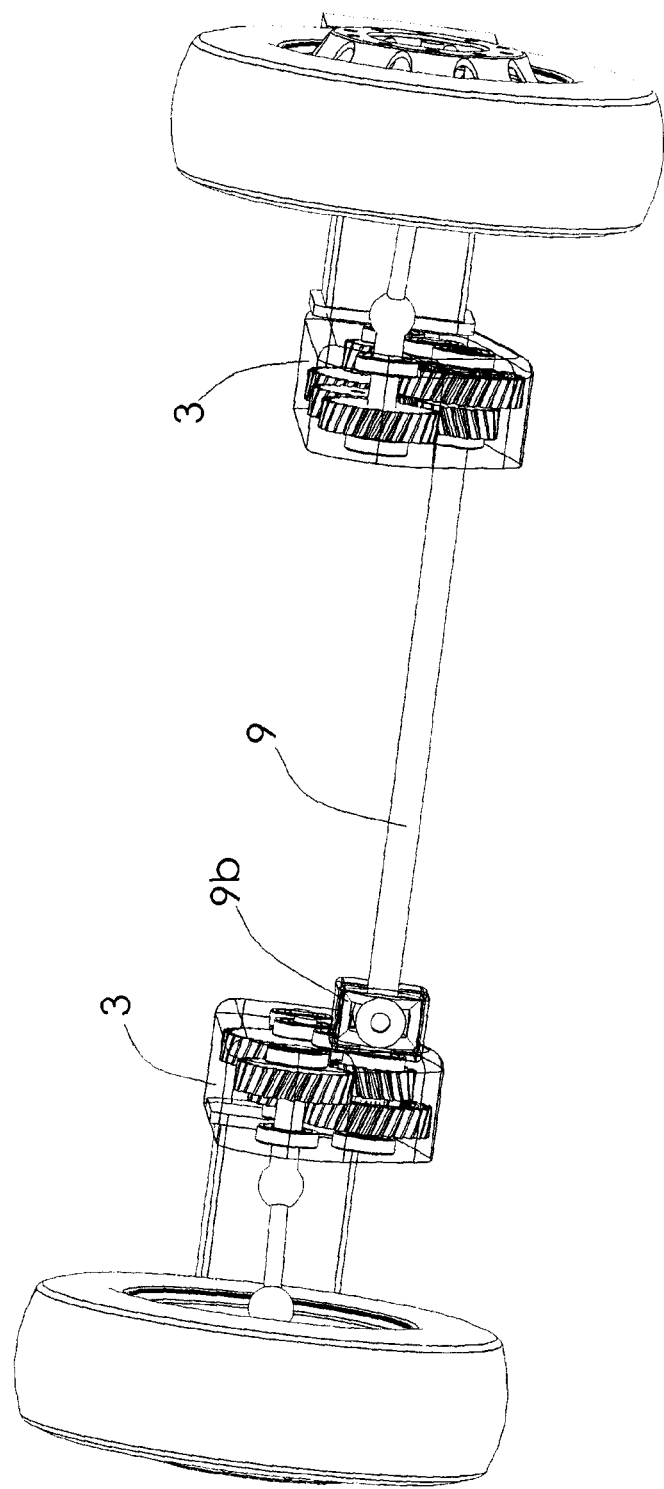
FIG. 3b is a view similar to FIG. 3a, but in which the reversal mechanism is combined with the epicyclic gear train of one of the casings.

For a torque to be transmitted to each of the drive wheels (1), right and left, one needs a means of opposing the torque of each of the sun gears (5) in such a way as to transmit the torque to the planet wheel carrier (6). In a first configuration, the electric motors (2) are controlled for typically providing a torque in the same direction. The left and right sun gears (5) are then in opposition by the intermediary of two half-shafts each rigidly connected to a sun gear (5) and connected together by a rotation reversal mechanism. According to this scenario illustrated in FIG. 3a, the linking means (9) then includes two half-shafts (9a) and a reversal mechanism (9b). In this configuration, the torque in the same direction provided by each of the motors (2) will oppose the torques of the sun gears (5) in order thus to transmit a torque to each of the planet wheel carriers (6) driving the drive wheels (1). Alternatively, the rotation reversal mechanism can be combined with one of the epicyclic gear trains (4), inter alia, as illustrated in FIG. 3b.

Figure 2A:
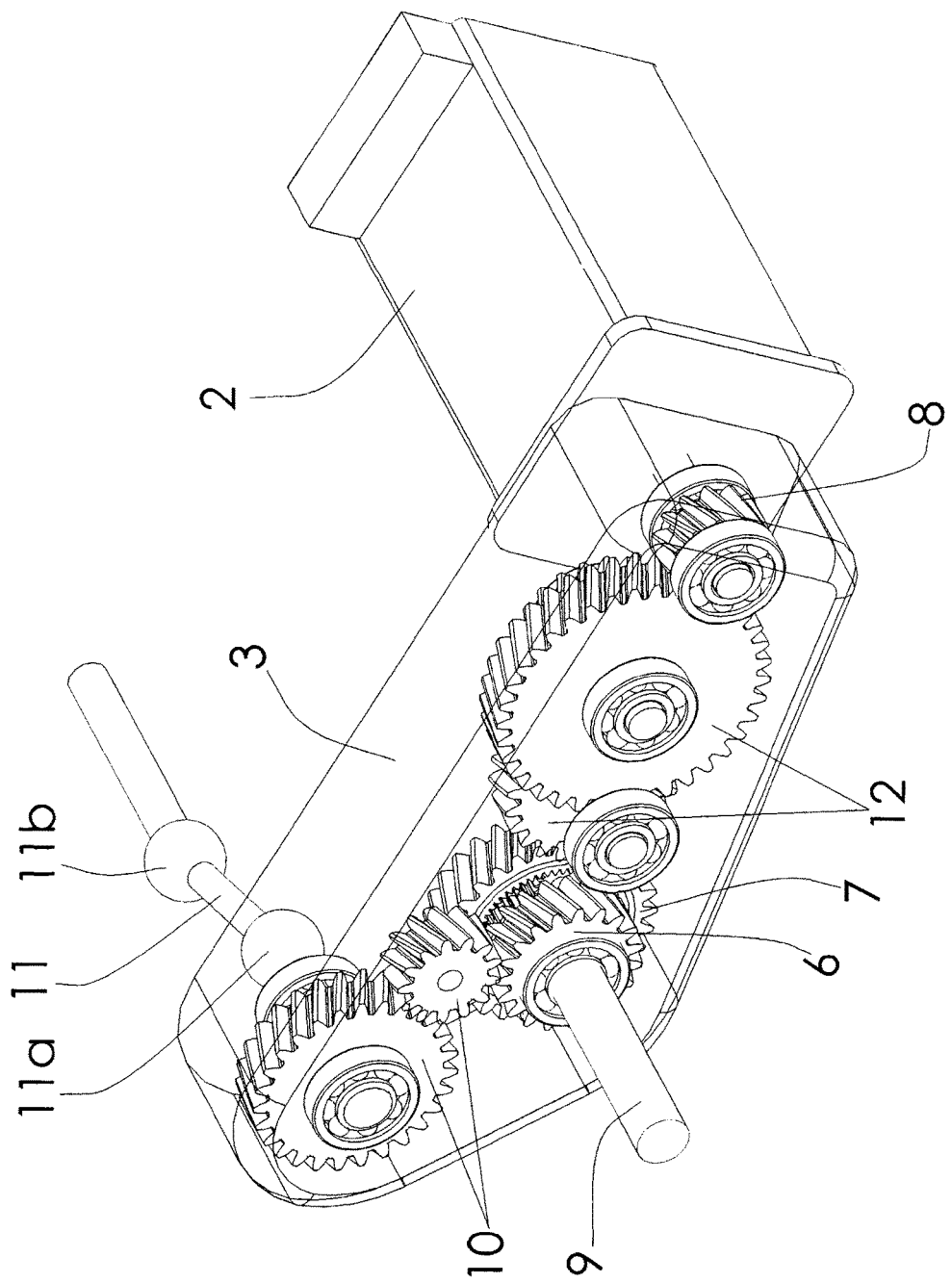
FIG. 2a is a view of the right portion of the system, showing the right casing and the gear set that it contains.
Figure 2B:
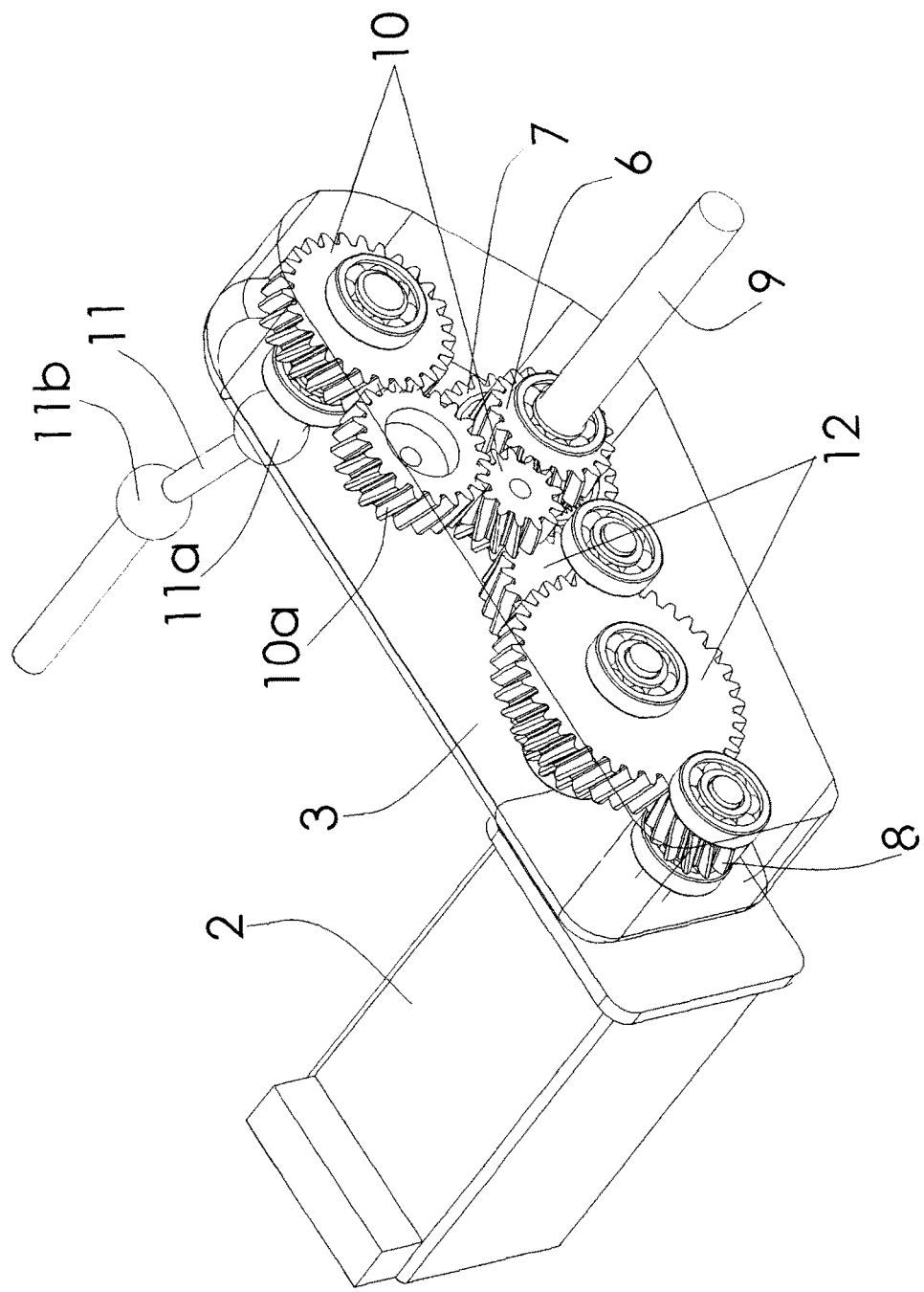
FIG. 2b is a view of the left portion of the system, showing the left casing and the gear set that it contains, the latter including a rotation reversal mechanism in the form of a toothed reversal wheel in the output gears.

According to an alternative configuration, the left and right sun gears (5) are connected by a single shaft (the linking means (9) of FIG. 1 is a single shaft without reversal mechanism) that makes them rotatably secured; the motors (2) are controlled rather for typically providing a torque each in an opposite direction such that this generates an opposite torque for each of the sun gears (5). The torque transmitted to each of the planet wheel carriers (6) is then opposite one with respect to the another. For transmitting a rotation in the same direction to each of the drive wheels (1), one of the linking means (right or left) of a planet wheel carrier (6) to a drive wheel (1) must include a rotation reversal mechanism such as a toothed reversal wheel (10a) added inside of the casing (3) within the output gear set (10) between the planet gear carrier (6) and the toothed wheel driving the half-shaft (11), as illustrated in FIG. 2b.

Therefore, a reversal mechanism can be situated at the junction of two half-shafts connecting the left and right sun gears, in the form of a reversing gear set, alternatively in one of the casings (3), right or left, combined with the epicyclic gear train (4) in order to reverse the rotation of one of the sun gears (5), or alternatively, if the motors (2) are typically controlled for transmitting an opposite torque, in the form of a toothed reversal wheel added at the output of the planet wheel carrier (left or right) whose rotation needs to be reversed.

Furthermore, the system allows an optimal use of the torque and speed characteristics of electric motors (2) by acting as torque converter. According to the first configuration described above, in which the motors are controlled for typically providing a torque in the same direction, during starting of the vehicle, the two motors (2) put in rotation in opposite directions and sped up without any torque being transmitted to the wheels (1). The motors (2) are brought to the speed of rotation where they can develop their maximum torques. In order to move the vehicle forward, the electric motor turning in the reverse direction is temporarily used in generator mode for the purpose of applying a braking torque. When the torques of the two motors are applied (one in drive mode and the other in braking mode) and since the motors are turning in opposite directions, the resultant is such that the two torques are applied in the same direction and the power is then transmitted to the drive wheels (1). This device makes it possible to apply the maximum torque of the motors to the wheels and this from the neutral point of the vehicle. This results in obtaining a correspondence between the torque and speed characteristics that can be produced by simple and economical electric motors and the torque and speed characteristics that are required for the wheels of the vehicle.

A feature of the system relates to the double differential function fulfilled by the two epicyclic gear trains (4). The combination of the two epicyclic gear trains (4) makes possible an equal distribution of the torque to the two wheels (1), even during turning and mainly when the two motors are not turning at exactly the same speed. It is simpler, less expensive and more energy efficient to control only the torque of the motors without regard to their relative positions. Additionally, this device makes possible a redundancy of motor means in which the vehicle can be kept in service (with reduced but sufficient characteristics) while only functioning on a single motor. Indeed, even with a single motor in service (with the other kept stationary by a blocking mechanism), an equal torque is transmitted to each of the drive wheels, enabling the vehicle to be used with a deterioration of the starting torque and a maximum speed reduced by half. This feature allows a tolerance of the failure of a large portion of the propulsion system without total loss of service. It is an important feature for vehicles with a high level of service such as public transport vehicles.

The system is also characterized by the fact that when a surplus of torque is available, at least one electric motor can be controlled in generator mode for recharging an electrical energy storage system.

The particular arrangement of the components in the wheel wells (13) and in the envelope of the floor (14) allows the drive system to be used on various types of wheel and axle sets. The drive system can be applied to any type of vehicle with drive wheels, for a front or rear wheel and axle set. The drive system also allows tandem arrangements, namely in the front and/or in the rear of the vehicle, with various combinations of drive and/or steer wheels. The fact that the drive wheels in the rear of the vehicle can also be steer wheels allows tandem arrangements in which the spacing between the axles is increased in comparison with the usual spacing. This allows a better distribution of the load on the road while minimizing wear on the tires and losses due to friction of the tires on the road. The proposed system for driving the drive wheels is an empowering element making it possible to design commercial vehicles of very different architecture. The possibility of drive and steer wheel and axle sets in the rear opens the way to single-track articulated or multi-articulated vehicles. Drive and steer rear wheels also open the way to driving articulated and multi-articulated vehicles in reverse.

The proposed drive system makes it possible to minimize the height of the floor of the vehicle while maximizing the ground clearance (two sought-after but generally conflicting features for low-floor vehicles). The system can enable one to minimize the space requirement as well as to minimize the unsprung mass by separating the power transfer function from the structural function of the rigid axle. By separating these functions, the power transfer components are then combined in the equivalent of a transaxle mounted on the chassis frame with the electric motors. A non-driving rigid axle (15) and half-shafts can be positioned longitudinally in the axis of the wheels. The assembly functioning as transaxle is offset longitudinally in order to make room for the rigid axle (15) and vertically in order to position it in the envelope of the floor (14) and wheel wells (13), thus freeing a maximum amount of space. As clearly shown in FIG. 1, the transaxle is characterized by a H-shaped geometry including longitudinal lateral members formed by the left casing and the right casing and an off-centered transversal member formed by the link (9) interconnecting the left and right casings. The elongated lateral members are oriented along a front-rear axis of the vehicle and extend behind the drive wheels (1). The motors (2) are mounted to the transaxle behind the wheels.

The epicyclic gear trains and the shaft connecting the sun gears of these epicyclic gear trains enable the left and right motors to have a combined effect which is also transmitted to the left and right wheels by the epicyclic gear trains. According to the techniques of the prior art, in this type of case in which two motors are combined, the arrangement is such that the transmission of the power occurs either in the axis of the electric motors or in the axis of the wheels.

According to one of the features of the present invention, a $3^{rd}$ axis is introduced, namely that of the sun gears of the epicyclic gear trains which do not correspond to the axis of the motors or to the axis of the wheels. This feature is illustrated clearly in the drawings. Therefore, there is a horizontal and vertical positioning inside of the drive system in which the axis of the motors, the axis of the sun gears and the axis of the wheels are all offset horizontally and vertically. Just as an illustration, the output pinion could be at a height of 17" (center of the wheel), the shaft of the sun gear could be at a height of 12" (center of the floor) and the pinion of the motors could be at a height of 15".

Various elements work together to allow the positioning of this $3^{rd}$ axis at the level of the floor. Thus, from the axis of the input pinions (8) of the casings connected to the electric motors (2), a first horizontal and vertical displacement is introduced by the input gear set (12) between the input pinion (8) and the epicyclic gear train (4). The configuration of this gear set (12) is chosen according to the specific configuration of the vehicle and therefore plays a role that goes beyond the simple speed reduction, all in order to shift the axis of the linking means (9) towards the floor of the vehicle. Next, the half-shafts (11) and the constant velocity joints (11a, 11b) allow greater freedom as to the relative positioning between the output point of the casing (3) and the input point of the wheel (1). Moreover, these joints make it possible to have different angles at the two ends of the half-shaft (11), thereby allowing steer wheels. This arrangement is of interest particularly for a low-floor vehicle and with a view to using two motors for purposes of redundancy and reliability.

The invention claimed is:

1. A low-floor vehicle comprising: a chassis frame and at least one left drive wheel and one right drive wheel connected by a non-driving rigid axle, a drive system for driving the drive wheels which is mounted on said chassis frame, said drive system including a left electric motor and a right electric motor mounted on a transaxle characterized by a H-shaped geometry including longitudinal lateral members and an off-centered transversal member, said longitudinal lateral members being formed by a left casing and a right casing, said off-centered transversal member being formed by a link interconnecting the left and right casings, said left and right casings having an elongated shape and oriented along a front-rear axis of the vehicle, said left and right casings each including an input shaft disposed at a first end of a lateral external face and an output shaft at a second end of the associated casing on the same lateral external face, said input and output shafts of each of the right and left casings being also vertically offset one relative to the other, each of said input shafts being driven by an associated one of the left and right electric motors mounted to the chassis frame behind the corresponding one of the left and right drive wheels, each of said output shafts being mounted for joint rotation with a half-shaft disposed at an output of the left and right casings, said half-shaft having ends provided with constant velocity joints and being rotatably secured to a corresponding wheel of said left and right drive wheels, each of the input shafts being rotatably drivingly connected to an input pinion mounted inside the associated one of the right and left casings, each of said input pinions disposed at said first end of the right and left casings driving an epicyclic gear train driven via a gear set, said epicyclic gear train having a ring gear, a planet wheel carrier and a sun gear, either one of the ring gear and of the planet wheel carrier being drivingly connected to said half-shaft arranged at the output of the second end of the casings, said epicyclic gear trains of the left and right casings being connected together by said link corresponding to the off-centered transversal member of the H-shaped transaxle, said link being rotatably secured to each of the sun gears of the left and right epicyclic gear trains, the sun gears of the left and right casings having opposite torques, said link being horizontally and vertically offset relative to the non-driving rigid axle and relative to an axis of rotation of the left and right drive wheels and located at the level of the lowered floor of the vehicle, the transaxle further comprising a rotation reversal means in order to transmit to each of the drive wheels a rotation in a same direction.

2. The vehicle according to claim 1, characterized in that the ring gear of each of the epicyclic gear trains of the left and right drive devices is connected to said input pinion via said gear set; the planet wheel carrier of each of the epicyclic gear trains, left and right, drives the link of the corresponding drive wheel.

3. The vehicle according to claim 1, characterized in that the link between the sun gears of each of the epicyclic gear trains is a shaft rotatably secured to each of the sun gears.

4. The vehicle according to claim 3, characterized in that said rotation reversal means is combined with one of the epicyclic gear trains, left or right, in order to reverse the direction of rotation of the sun gear of the latter.

5. The vehicle according to claim 3, characterized in that said rotation reversal means includes a reversal gear between the epicyclic gear train of one of the casings, right or left, and the linking means of the corresponding drive wheel.

6. The vehicle according to claim 1, characterized in that: the casings are located in wheel housings of the vehicle.

7. A method for controlling a drive system of a vehicle according to claim 1, characterized in that the control of the electric motors during starting of the vehicle occurs in such a way that the two motors are first put in rotation in opposition and sped up without any torque being transmitted to the wheels, and in which then a first of the two motors is used in generator mode in order to apply a braking torque, said braking torque being in the same direction as the torque of a second motor of the two motors but in which the rotation transmitted is counter to the rotation transmitted by the second motor.

8. A method for controlling a drive system of a vehicle according to claim 1, characterized in that at least one of said electric motors is controlled in generator mode for recharging an electrical energy storage system when a surplus of torque is available.

9. A drive wheel and axle set of a vehicle having a chassis frame, the drive wheel and axle set comprising: at least one left drive wheel and one right drive wheel connected together by a non-driving rigid axle, a drive system mounted on said chassis frame, said drive system comprising a left electric motor and a right electric motor mounted on a transaxle characterized by a H-shaped geometry including longitudinal lateral members and an off-centered transversal member, said longitudinal lateral members being formed by a left casing and a right casing, said off-centered transversal member being formed by a link interconnecting the left and right casings, said left and right casings having an elongated shape and each including an input shaft disposed at a first end of a lateral external face and an output shaft at a second end of the associated casing on the same lateral external face, said input and output shafts of each of the right and left casings being also vertically offset one relative to the other, each of said input shafts being driven by an associated one of the left and right electric motors mounted to the chassis frame behind the corresponding one of the left and right drive wheels, each of said output shafts being mounted for joint rotation with a half-shaft disposed at an output of the left and right casings, said half-shaft having ends provided with constant velocity joints and being rotatably secured to a corresponding wheel of said left and right drive wheels, each of the input shafts being rotatably drivingly connected to an input pinion mounted inside the associated one of the right and left casings, each of said input pinions disposed at the first end of the right and left casings driving an epicyclic gear train driven via a gear set, said epicyclic gear train having a ring gear, a planet wheel carrier and a sun gear, either one of the ring gear and of the planet wheel carrier being drivingly connected to said half-shaft arranged at the output of the second end of the casings, said epicyclic gear trains of the left and right casings being connected together by said link corresponding to the off-centered transversal member of the H-shaped transaxle, said link being rotatably secured to each of the sun gears of the left and right epicyclic gear trains, the sun gears of the left and right casings having opposite torques, said link being horizontally and vertically offset relative to the non-driving rigid axle and relative to an axis of rotation of the left and right drive wheels, the transaxle further comprising a rotation reversal means in order to transmit to each of the drive wheels a rotation in a same direction.

10. The drive wheel and axle set according to claim 9, characterized in that the drive wheels are also coupled to a steering system.

11. The drive wheel and axle set according to claim 9, characterized in that said drive wheel and axle set is part of a tandem arrangement including more than one axle.

12. A drive system for driving the drive wheels of a vehicle having a chassis frame, and at least one left drive wheel and one right drive wheel, said drive system including a left electric motor and a right electric motor mounted on a transaxle characterized by a H-shaped geometry including longitudinal lateral members and an off-centered transversal member, said longitudinal lateral members being formed by a left casing and a right casing, said off-centered transversal member being formed by a link interconnecting the left and right casings, said transaxle being mounted to the chassis frame, said left and right casings having an elongated shape and each including an input shaft disposed at a first end of a lateral external face and an output shaft at a second end of the associated casing on the same lateral external face, said input and output shafts of each of the right and left casings being also vertically offset one relative to the other, each of said input shafts being driven by an associated one of the left and right electric motors, each of said output shafts being mounted for joint rotation with a half-shaft disposed at an output of the left and right casings, said half-shaft having ends provided with constant velocity joints and being rotatably secured to a corresponding wheel of said left and right drive wheels, each of the input shafts being rotatably drivingly connected to an input pinion mounted inside the associated one of the right and left casings, each of said input pinions disposed at the first end of the right and left casings driving an epicyclic gear train driven via a gear set, said epicyclic gear train having a ring gear, a planet wheel carrier and a sun gear, either one of the ring gear and of the planet wheel carrier being drivingly connected to said half-shaft arranged at the output of the second end of the casings, said epicyclic gear trains of the left and right casings being connected together by said link corresponding to the off-centered transversal member of the H-shaped transaxle, said link being rotatably secured to each of the sun gears of the left and right epicyclic gear trains, the sun gears of the left and right casings having opposite torques, said link being horizontally and vertically offset relative to an axis of rotation of the left and right drive wheels, the transaxle further comprising a rotation reversal means in order to transmit to each of the drive wheels a rotation in a same direction.

13. The drive system according to claim 12, characterized in that the ring gear of each of the epicyclic gear trains of the left and right casings is connected to said input pinion via said gear set; the planet wheel carrier of each of the epicyclic gear trains, left and right, drives the link of the corresponding drive wheel.

14. The drive system according to claim 13, characterized in that the link between the sun gears of each of the epicyclic gear trains is a shaft rotatably secured to each of the sun gears.

15. The drive system according to claim 14, characterized in that said rotation reversal means is combined with one of the epicyclic gear trains, left or right, in order to reverse the direction of rotation of the sun gear of the latter.

16. The drive system according to claim 14, characterized in that said rotation reversal means includes a reversal gear between the epicyclic gear train of one of the casings, left or right, and the linking means of the corresponding drive wheel.

17. The drive system according to claim 13, characterized in that the link between the sun gears of each of the epicyclic gear trains includes two half-shafts each rotatably secured to a sun gear and which are connected by said rotation reversal means, said rotation reversal means including a rotation reversing gear set.

18. The drive system according to claim 12, characterized in that the planet wheel carrier of each of the epicyclic gear trains, left and right, is driven by the input pinion of the corresponding casing; the ring gear of each of the epicyclic gear trains, left and right, drives the linking means of the corresponding drive wheel.

19. A vehicle including a drive system according to claim 12, and characterized in that: the casings are located in wheel housings of the vehicle, and the linking means between the sun gears of the casings is located in the envelope of a floor of said vehicle.

* * * * *